(12) United States Patent
Hernandez et al.

(10) Patent No.: US 10,169,448 B2
(45) Date of Patent: Jan. 1, 2019

(54) SERVING FONT GLYPHS

(71) Applicant: Google Inc., Mountain View, CA (US)

(72) Inventors: Nestor Felipe Hernandez, San Francisco, CA (US); Shaoting Cai, San Francisco, CA (US)

(73) Assignee: Google LLC, Mountain View, CA (US)

(*) Notice: Subject to any disclaimer, the term of this patent is extended or adjusted under 35 U.S.C. 154(b) by 584 days.

(21) Appl. No.: 14/763,755

(22) PCT Filed: Jan. 14, 2014

(86) PCT No.: PCT/IB2014/058263
§ 371 (c)(1),
(2) Date: Jul. 27, 2015

(87) PCT Pub. No.: WO2014/118661
PCT Pub. Date: Aug. 7, 2014

(65) Prior Publication Data
US 2015/0363410 A1 Dec. 17, 2015

(30) Foreign Application Priority Data

Jan. 31, 2013 (EP) .................... 13153545

(51) Int. Cl.
*G06F 17/30* (2006.01)
*G06F 17/21* (2006.01)
*G06F 17/27* (2006.01)

(52) U.S. Cl.
CPC ........ *G06F 17/3064* (2013.01); *G06F 17/214* (2013.01); *G06F 17/276* (2013.01);
(Continued)

(58) Field of Classification Search
CPC ............. G06F 17/214; G06F 17/30011; G06F 17/30864
See application file for complete search history.

(56) References Cited

U.S. PATENT DOCUMENTS

| 5,940,581 A | 8/1999 | Lipton |
| 6,252,671 B1 | 6/2001 | Peng et al. |
| (Continued) | | |

FOREIGN PATENT DOCUMENTS

| WO | WO-2010/104906 A2 | 9/2010 |
| WO | WO-2011/096945 A1 | 8/2011 |

OTHER PUBLICATIONS

Bast, H. et al., "Type less, find more: fast autocompletion search with a succinct index", Proceedings of the 29th Annual International ACM Sigir Conference on Research and Development in Information Retrieval ACM New York, NY, Aug. 6, 2006, pp. 364-371, Retrieved from the Internet: https://people.mpi-inf.mpg.de/~bast/papers/autocompletion-sigir.pdf [retrieved on Jun. 5, 2015].

(Continued)

*Primary Examiner* — Jeff A Burke
*Assistant Examiner* — Cindy Nguyen
(74) *Attorney, Agent, or Firm* — Foley and Lardner LLP

(57) ABSTRACT

A system 20 and computer-implemented method is disclosed which involves receiving at a server 24 a live query that is being entered at a client location 22 in relation to creating an electronic document, the query comprising plural characters that have been entered. The system 20 and method uses the query to predict characters that might follow the plural characters that have been entered at the client location. Next, a glyph set is obtained which includes the plural characters that have been entered and the predicted characters in a font, the glyph set being absent of other glyphs of the font. The obtained glyph set is then sent to the client location for use in creating the electronic document.

16 Claims, 8 Drawing Sheets

(52) U.S. Cl.
CPC .. *G06F 17/30687* (2013.01); *G06F 17/30864* (2013.01); *G06F 17/30902* (2013.01)

(56) References Cited

U.S. PATENT DOCUMENTS

| | | | |
|---|---|---|---|
| 6,313,920 | B1 | 11/2001 | Dresevic et al. |
| 9,384,389 | B1* | 7/2016 | Sankaranarayanan ........................ G06K 9/00456 |
| 2005/0275656 | A1 | 12/2005 | Corbin et al. |
| 2006/0170684 | A1* | 8/2006 | Kobayashi ............ G06F 17/214 345/467 |
| 2006/0170685 | A1 | 8/2006 | Wilson Brown |
| 2007/0159646 | A1 | 7/2007 | Adelberg et al. |
| 2010/0231598 | A1 | 9/2010 | Hernandez et al. |
| 2011/0126191 | A1 | 5/2011 | Hughes et al. |
| 2011/0271180 | A1 | 11/2011 | Lee |
| 2011/0289407 | A1 | 11/2011 | Naik et al. |
| 2014/0136957 | A1* | 5/2014 | Kaasila ................. G06F 17/214 715/235 |
| 2014/0153012 | A1* | 6/2014 | Seguin .................... G06F 3/121 358/1.11 |

OTHER PUBLICATIONS

Deniz Yuret: "Lexical Attraction Models of Language", Jan. 1, 2006, pp. 1-7, Cambridge, MA, Retrieved from the Internet: http://people.csail.mit.edu/gremio/Grembrary/Winston-HIE/yuret.pdf [retrieved on Nov. 22, 2013].

Extended European Search Report on EP 13153545.2, dated Dec. 9, 2013, 8 pgs.

International Search Report and Written Opinion on PCT/IB14/58263, dated May 12, 2014, 11 pgs.

EP Examination Report in EP 13153545.2, dated Nov. 11, 2015, 5 pgs.

International Preliminary Report on Patentability on PCT/IB2014/058263, dated Aug. 13, 2015, 10 pgs.

\* cited by examiner

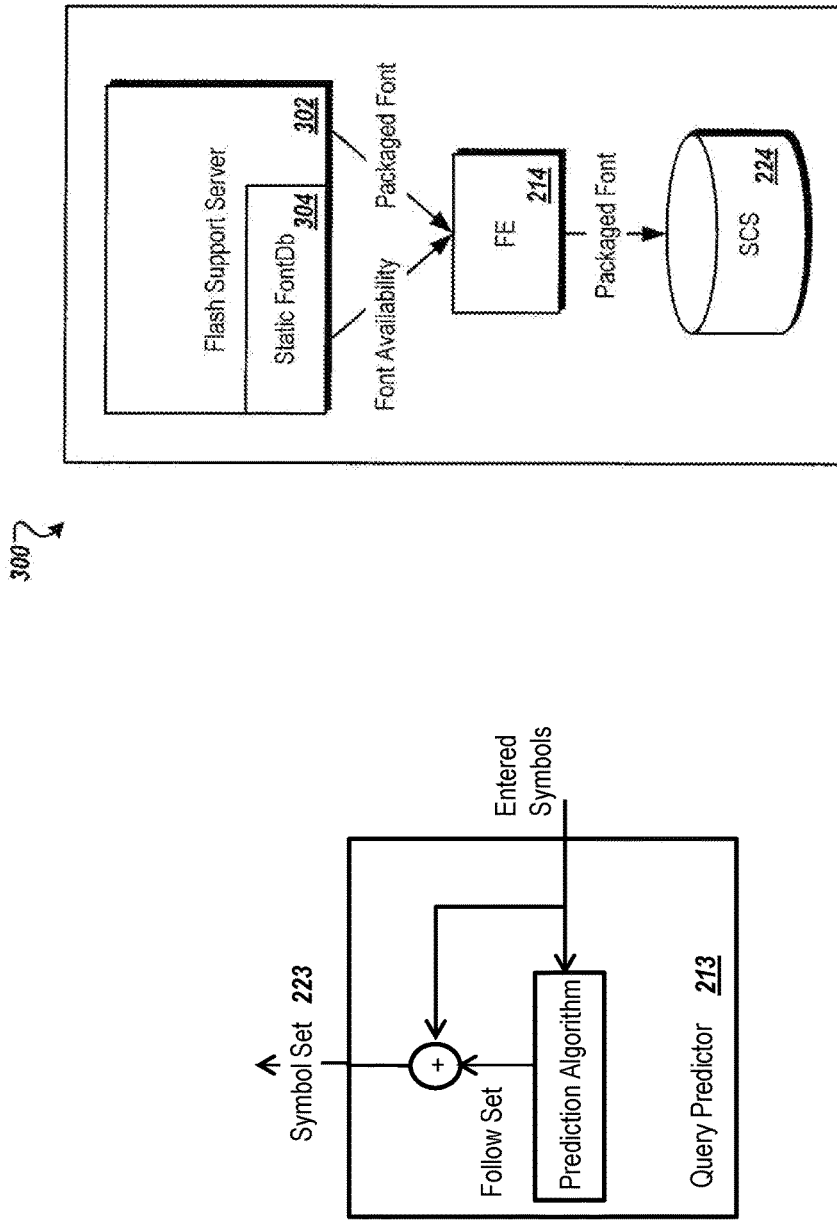

| Font | Advanced Antialising? | Characters | Median Compile Time (ms) | Swf Size (Bytes) |
|---|---|---|---|---|
| Arial | No | all | 984 | 89660 |
| Arial | No | "ABC" | 594 | 1553 |
| Arial | No | "Visit the Complete Adobe Font Page & Shop Now for Over 2,300 Fonts." | 659 | 4864 |
| Arial Unicode | No | ABC | 1056 | 1560 |
| Arial Unicode | No | "価格.comでゲームの価格を徹底比較 役立つユーザーレビューも満載！" | 1079 | 5650 |

FIG. 6

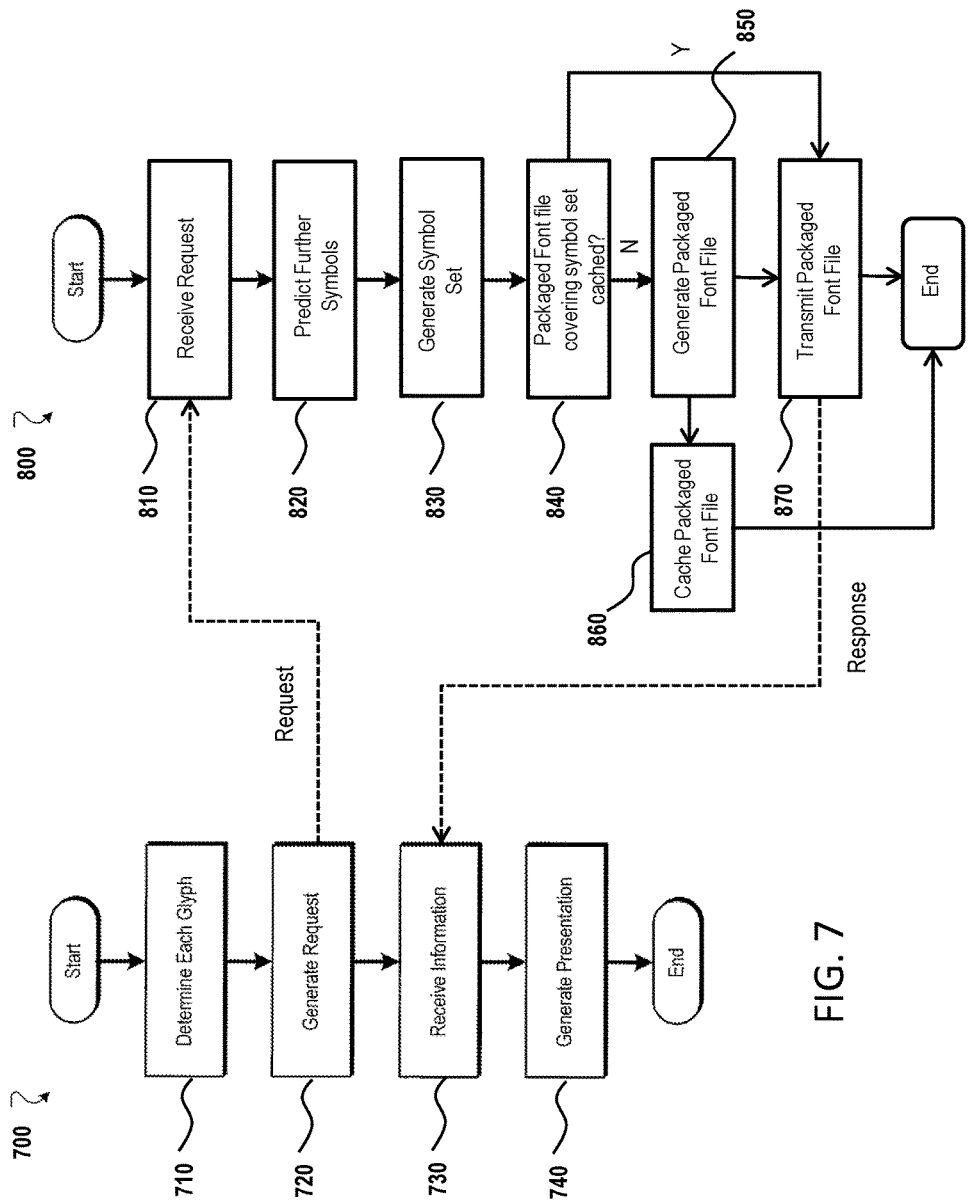

US 10,169,448 B2

SERVING FONT GLYPHS

CROSS-REFERENCE TO RELATED PATENT APPLICATIONS

This application is a U.S. National Stage Application of, and claims priority to, International Application No. PCT/IB2014/058263, filed on Jan. 14, 2014, which claims priority to European Patent Application 13153545.2, filed Jan. 31, 2013, both of which are incorporated herein by reference in their entirety.

TECHNICAL FIELD

This document relates to information processing.

BACKGROUND

Computer systems are used to distribute various kinds of content. One example of content is advertising, where advertisements can be presented on a computer screen, on a television screen or on a billboard, to name just a few examples. Content such as an advertisement can be created for display to all members of a general intended audience, or the content presentation can be determined on a user-by-user basis, for example.

Text included in content can be generated using one or more fonts. A font can include characters that make up a complete typeface, of which common examples are Times, Courier and Helvetica. Content in languages other than English can use non-Latin scripts for rendering a message. Fonts are sometimes packaged together with a particular electronic document, such as an advertisement. When collected in a file, some non-Latin scripts can occupy a significant amount of storage space, such as of the order of 20 MB.

A known system for serving fonts to a client device sends a font file containing only a subset of glyphs for a given font in response to a request from the client. The font file is therefore of a smaller size than if all possible font glyphs were transmitted. For example, if a word is entered at the client, the server in response creates a font file containing glyphs corresponding to the entered characters only. If further characters are subsequently entered, a further request needs to be sent to the server which then has to generate and return a new font file containing the updated glyphs. Such additional transfers incur a bandwidth, storage and time cost.

SUMMARY

In a first aspect, there is provided a method comprising: receiving at a server a live query that is being entered at a client location in relation to creating an electronic document, the query comprising plural characters that have been entered; using the query to predict characters that might follow the plural characters that have been entered at the client location; obtaining a glyph set including the plural characters that have been entered and the predicted characters in a font, the glyph set being absent of other glyphs of the font; and sending the glyph set to the client location for use in creating the electronic document.

The step of obtaining the glyph set may comprise creating the glyph set.

The step of obtaining the glyph set may comprise: searching for a superset of glyphs that contain the plural characters that have been entered and the predicted characters in a font; if a superset is found, returning the superset in reply to the request; and if a superset is not found, generating a superset of glyphs that contain the plural characters that have been entered and the predicted characters in a font, returning the superset in reply to the request, and storing the generated superset in a cache.

The step of using the query to predict characters further may comprise identifying plural sets of predicted characters, or words or phrases formed of characters, and associating with each set a numerical probability of those characters being entered subsequently, and wherein obtaining the glyph set comprises only obtaining predicted characters for set(s) having a probability that is above a probability threshold.

The method may further comprise adjusting the probability threshold dynamically based on whether, for an obtained glyph set, the subsequently-entered characters are present in the obtained glyph set. For example, the probability threshold may be lowered if subsequently-entered characters are not present in the obtained glyph set.

The method may further comprise adjusting the probability threshold dynamically to ensure a predetermined number of sets of predicted characters, or words or phrases formed of characters, are identified.

The step of using the query to predict characters may comprise using a prediction algorithm that takes as input the plural characters that have been entered and applies them to a language model indicative of character, word or phrase co-occurrence in sample text, the prediction algorithm returning one or more predicted characters based on predicted character, word or phrase co-occurrence.

The step of using the query to predict characters may comprise using a prediction algorithm that takes as input the plural characters that have been entered and applies them to a language model indicative of lexical attraction between pairs of words, the prediction algorithm returning one or more predicted characters based on lexical attraction between words formed by the entered characters and words in the model.

The language model may indicate co-occurrence or lexical attraction between characters, words or phrases in a body of text associated with a particular type of information, e.g. advertising.

The method may further comprise receiving identification of a font with the query and obtaining the glyph set for that font.

The step of obtaining a glyph set may comprise bundling the glyphs in a single file, e.g. a .swf file, and sending the file to the client location.

A second aspect of the invention provides a method comprising:
  a client sending to a server a live query that is being entered at the client, the query comprising plural characters that have been entered in relation to creating an electronic document;
  the client receiving from the server obtaining a glyph set including the plural characters that have been entered and the predicted characters in a font, the glyph set being absent of other glyphs of the font; and
  the client using the glyph set in creating the electronic document A third aspect of the invention provides a non-transitory computer-readable storage medium having stored thereon computer-readable code, which, when executed by computing apparatus, causes the computing apparatus to perform a method comprising: receiving at a server a live query that is being entered at a client location in relation to creating an electronic document, the query comprising plural characters that have been entered; using the query to predict characters that might follow the plural characters that have been entered at the client location; obtaining a glyph set including the plural characters that have been entered and the predicted characters in a font, the glyph set being absent of other glyphs of the font; and sending the glyph set to the client location for use in creating the electronic document.

A fourth aspect of the invention provides apparatus, the apparatus having at least one processor and at least one memory having computer-readable code stored thereon which when executed controls the at least one processor: to receive at a server a live query that is being entered at a client location in relation to creating an electronic document, the query comprising plural characters that have been entered; to use the query to predict characters that might follow the plural characters that have been entered at the client location; to obtain a glyph set including the plural characters that have been entered and the predicted characters in a font, the glyph set being absent of other glyphs of the font; and to send the glyph set to the client location for use in creating the electronic document.

A fifth aspect of the invention provides apparatus comprising: means configured to receive a live query that is being entered at a client location in relation to creating an electronic document, the query comprising plural characters that have been entered; means configured to use the query to predict characters that might follow the plural characters that have been entered at the client location; means configured to obtain a glyph set including the plural characters that have been entered and the predicted characters in a font, the glyph set being absent of other glyphs of the font; and means configured to send the glyph set to the client location for use in creating the electronic document.

A sixth aspect of the invention provides a non-transitory computer-readable storage medium having stored thereon computer-readable code, which, when executed by computing apparatus, causes the computing apparatus to perform a method comprising:
  a client sending to a server a live query that is being entered at the client, the query comprising plural characters that have been entered in relation to creating an electronic document;
  the client receiving from the server obtaining a glyph set including the plural characters that have been entered and the predicted characters in a font, the glyph set being absent of other glyphs of the font; and
  the client using the glyph set in creating the electronic document.

A seventh aspect of the invention provides apparatus having at least one processor and at least one memory having computer-readable code stored thereon which when executed controls the at least one processor:
  to send from a client to a server a live query that is being entered at the client, the query comprising plural characters that have been entered in relation to creating an electronic document;
  to receive at the client from the server obtaining a glyph set including the plural characters that have been entered and the predicted characters in a font, the glyph set being absent of other glyphs of the font; and
  to use the glyph set in creating the electronic document.

An eighth aspect of the invention provides apparatus comprising:
  means configured to send from a client to a server a live query that is being entered at the client, the query comprising plural characters that have been entered in relation to creating an electronic document;
  means configured to receive at the client from the server obtaining a glyph set including the plural characters that have been entered and the predicted characters in a font, the glyph set being absent of other glyphs of the font; and
  means configured to use the glyph set in creating the electronic document.

A ninth aspect of the present invention provides a computer program comprising instructions that when executed by a computer apparatus control it to perform any method above.

The details of one or more implementations are set forth in the accompanying drawings and the description below. Other features and advantages will be apparent from the description and drawings, and from the claims.

DESCRIPTION OF DRAWINGS

FIGS. 4(a) and 4(b) show a first example graphical user interface that can serve part of all of a font according to the invention;

FIG. 5 shows a second example system that includes a font server;

FIG. 6 shows a table with example compile times and file sizes;

FIG. 7 shows a flowchart of an example method for obtaining a font from a server;

FIG. 8 shows a flowchart of an example method for serving a font to a client.

Like reference symbols in the various drawings indicate like elements.

DETAILED DESCRIPTION

Figure 1:
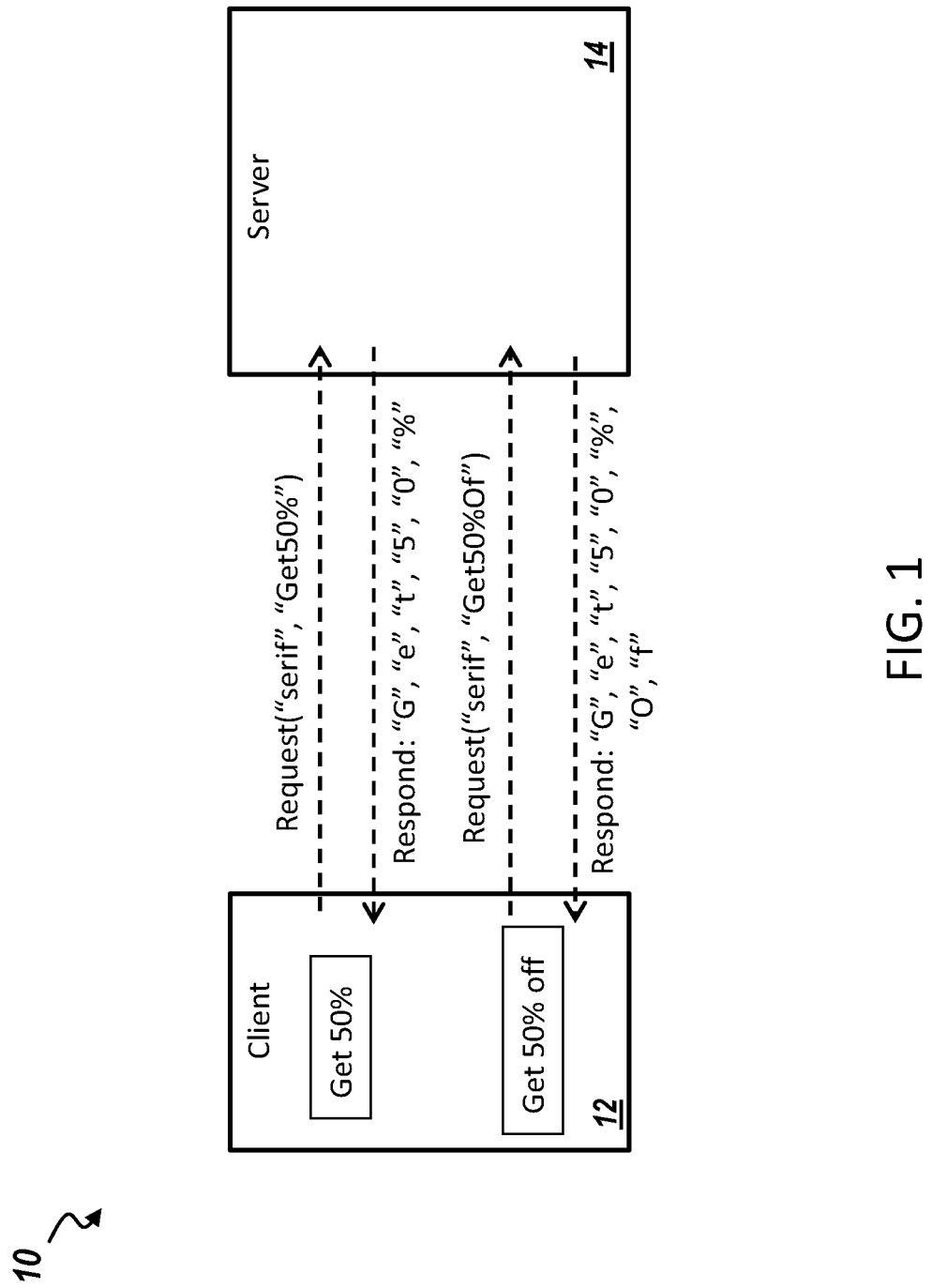
FIG. 1 shows in overview a prior art method for serving fonts to a client.

FIG. 1 illustrates in overview a prior art method and system 10 for serving to a client 12 a sub set of glyphs taken from all available glyphs for a given font in response to a live client-side query, for example one entered into a search portal at the client. The user commences typing in a query at the client 12, in this case "Get 50%" and this request is transmitted to a font server 14 with identification of the font name. The server 14 responds with a font file containing a set or bundle of glyphs for the font that covers the requested symbols "G", "e", "t", "5", "0", "%". If the user's intent is however to enter "Get 50% Off" as the complete query, then entry of the further characters at the client 12 requires a further request to be transmitted to the server 14 which responds with another font file containing the glyph set "G", "e", "t", "5", "0", "%", "O", "f". The previous font file is redundant and discarded. The first request was a wasted operation involving wasted bandwidth, memory and time.

Figure 2:
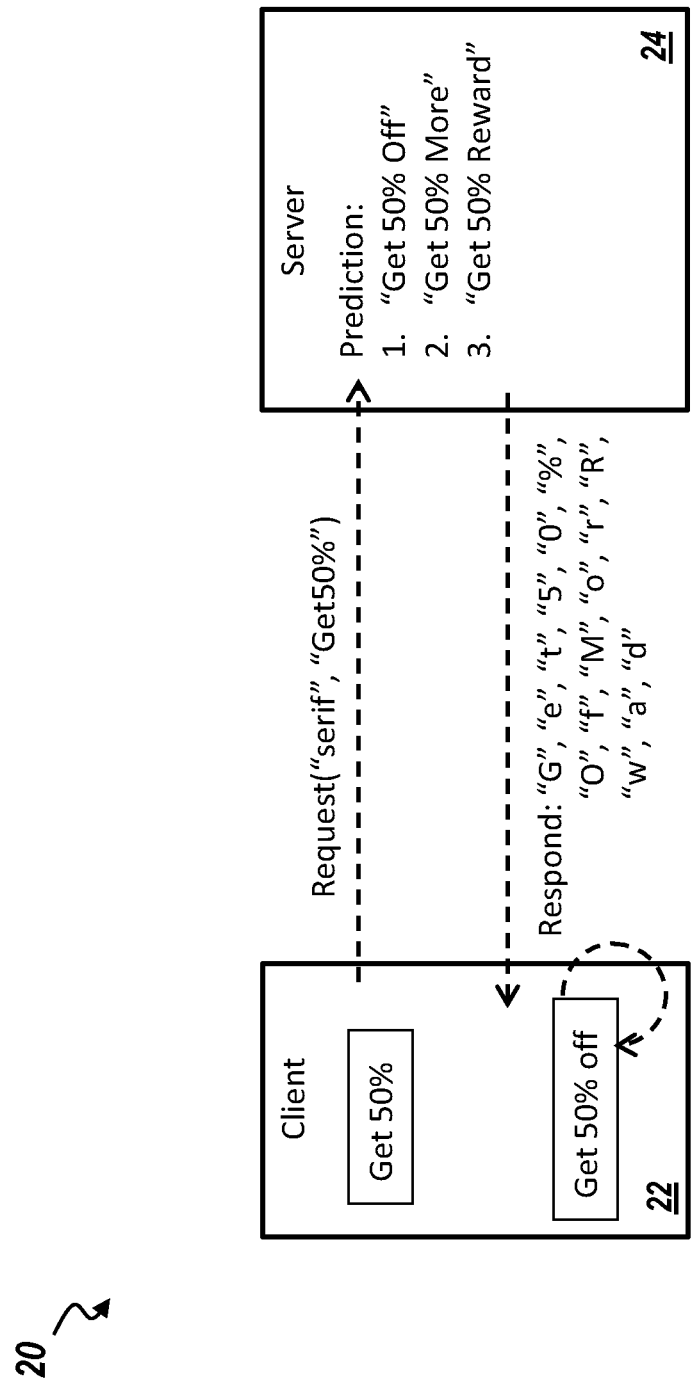
FIG. 2 shows in overview a method for serving fonts to a client according to the invention.

FIG. 2 illustrates in overview a method and system 20 according to the invention. Here, a prediction algorithm is employed at, or is associated with, a font server 24. In response to a query entered at a client 22 in relation to creating an electronic document, the server 24 employs the prediction algorithm to determine a "symbol follow-set" based on the already-entered symbols. As an example, the prediction algorithm might generate "Get 50% Off", "Get 50% More" and "Get 50% Reward" as the query possibilities with the underlined parts comprising the symbol follow-set. In operation, the server 24 is configured to generate a font file comprising a glyph set covering the already entered symbols and each unique symbol of the follow-set(s). If all three possibilities are used, the font file will comprise glyphs corresponding to "G", "e", "t", "5", "0", "%", "O", "f", "M", "o", "r", "R", "w", "a", "d" in the font identified by the client query; the font file contains only this glyph set and is sent to the client 22 in a single response. If the subsequent user input falls into one of the three predictions, or contains symbols which are a subset of the received glyph set, then the client 22 does not need to make another request.

The processing and storage cost of expanding a glyph set to cover predicted symbols or characters is considerably less significant than the cost of handling a new request.

The terms symbols and characters are interchangeable in the context of this description. The term font file means a file, e.g. a .swf file, which contains glyphs corresponding to symbols or characters in a particular font.

Figure 3:
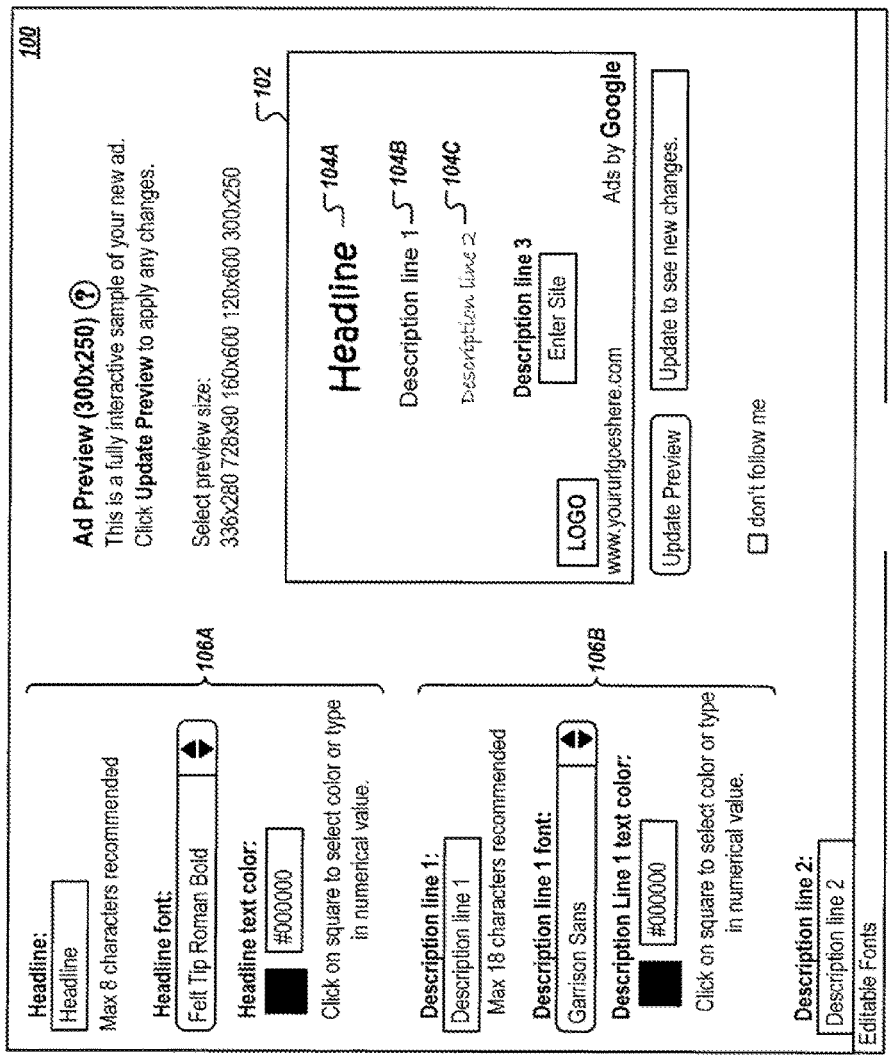
FIG. 3 shows an example graphical user interface that can be used for creating an electronic document.

A more detailed description of a document serving system will now be described. FIG. 3 shows an example graphical user interface 100 that can be used for creating an electronic document. In some implementations, a document creator such as an advertisement designer uses the interface 100 to create a document (e.g., an ad) for review by and/or display to one or more other people (e.g., an ad editor or an ad recipient). For example, the interface 100 can allow the creator to use one or more fonts (such as an existing font or a custom font defined by the creator) in the document; the system or application receiving the created document can retrieve, from a designated font server, as much of the font as necessary for displaying the document.

The interface 100 can include a preview area 102. The preview area 102 can include one or more content portions such as images, graphics, text, links or any other content that the creator chooses to include in the document. Here, the preview area 102 currently includes text portions 104A-C, among others. The interface 100 can include one or more areas 106 dedicated to formatting content for the document. In some implementations, formatting can be applied on a portion-by-portion basis for the included content. For example, the area 106A can be used to choose one or more formatting aspects for the portion 104A, and the area 106B similarly for the portion 104B, and so on.

In some implementations, the creator can enter a text content of the portion, choose a font for the portion, and/or select a color for the portion using the area 106. For example, the text portion 104A here includes the content "Headline" written using the font Felt Tip Roman Bold in the color identified as "#000000".

As such, the created document, such as an ad, will contain content portions that may require use of one or more fonts for display. That is, when the document is forwarded to another user, such as to an editor or a final recipient in reply to a query, the receiving system will use part or all of the font(s). The required font can be embedded in the electronic document or otherwise stored in the receiving system. If so, the receiving system can retrieve the font from that location and display the document. As another example, the font may be available from a dynamic font server and the receiving system can request the font from the font server for use with the particular document. In preferred implementations, only as much of the font as is necessary for the display is requested and/or transferred together with fonts forming part of the predicted follow-set. For example, if the receiving system only needs, say, about 10% of the glyphs of the font, the system can indicate this in the request and the font server can package and return a subset comprising the requested and predicted font glyphs in response to the request.

Figure 4A:
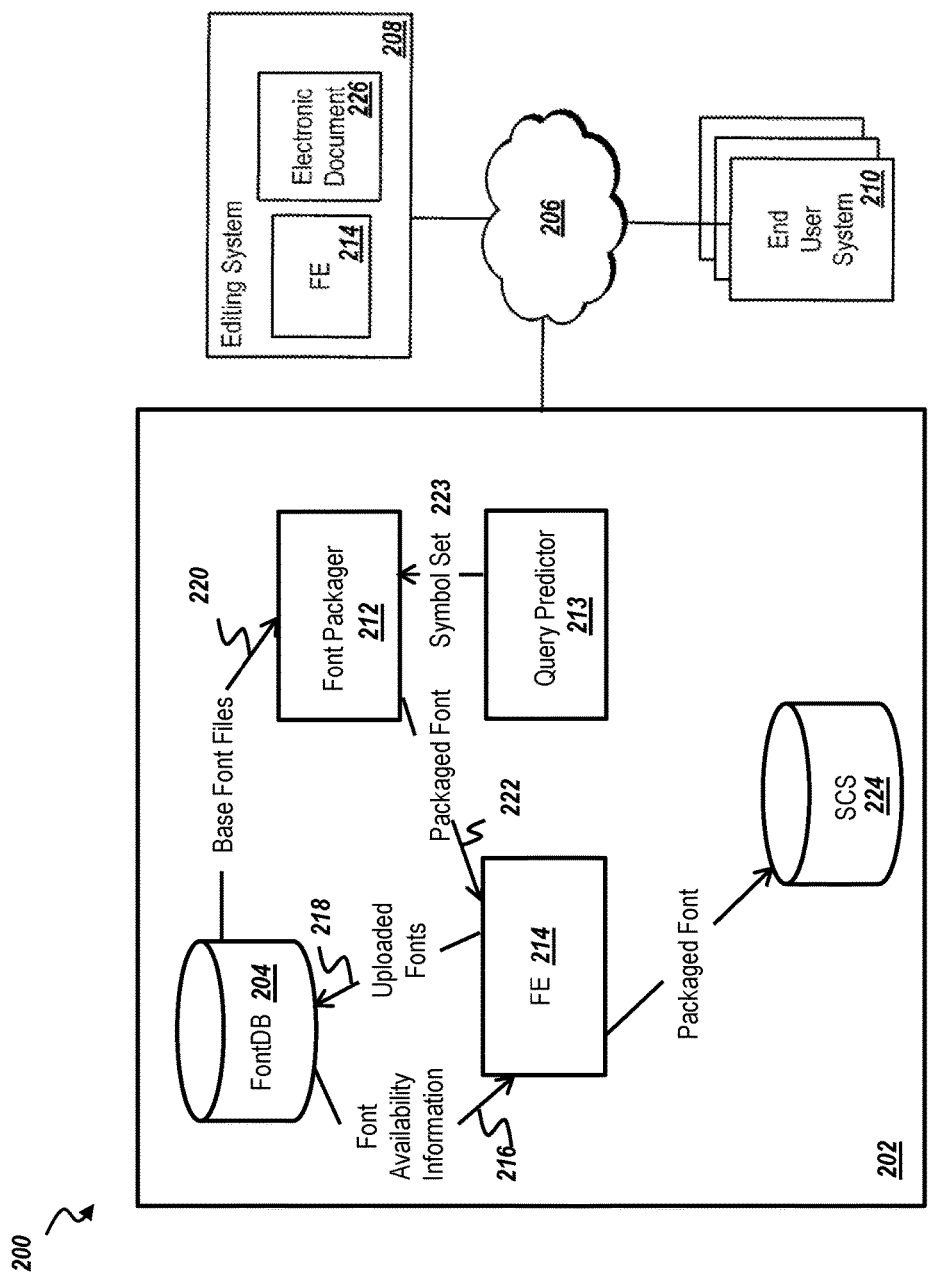

FIG. 4(a) shows an example system 200 that can serve part or all of a font. The system 200 can include a computer system 202 that can include predefined and/or custom fonts in a font database 204. The computer system 202 can include any kind of computer device including, but not limited to, a server device. The font database 204 includes information that defines at least one font comprising multiple glyphs, such as any or all glyphs of the font Serif or Felt Tip Roman Bold mentioned in the above examples. The computer system 202 can be connected to any kind of network 206, such as to a local network and/or to the internet. Through the network 206, the computer system 202 can communicate with one or more other systems, such as with an editing system 208 and/or with an end user system 210 which may provide for searching advertising content. For example, the computer system 202 can serve one or more glyphs for use by the system 208 and/or 210 in presenting an electronic document such as an ad.

In some implementations, the font database 204 can contain any or all of the following font information items: a font identifier, a font name, a font language, a font script, font available Unicode characters, an image preview of the font, a user identifier (e.g., for a custom defined font), base font file bytes, and/or base font file hash. In some implementations, a font name can be localized, such as by having one font name for English, another font name for Chinese, and so on. A local font name can be used in presenting available fonts to users in different locales. Upon a font being uploaded to the font database 204 (such as a custom font), basic registration for the font can be performed (in some implementations including language and/or script determination). The font database 204 can interface with one or more components, for example to provide functionality for the following use cases. A document creator can be shown a list of relevant fonts while editing. For example, language information for each font can be used, such as to allow user selection. For example, information about available glyphs for each font can be used, such as for user feedback when a specified character cannot be rendered. For example, information about font ownership can be maintained, such as for showing a particular account's custom fonts. A custom font can be uploaded. For example, the owner of the custom font can be registered. For example, information about the font can be registered, such as available characters. For example, a unique font identifier can be generated. For example, a quota per account can be established and tracked. Access to original font file bytes can be granted, such as for copying to local file caches.

The computer system 202 includes a font packager 212. The font packager 212 includes the necessary infrastructure for dividing any font into a subset ("glyph set") containing the glyphs needed for a particular document and compiling the glyph(s) into a font file, such as a .swf file. In some implementations, the font packager 212 can receive a request from a device such as the system 208 and/or 210. The font packager 212 can also receive a request from a query predictor 213 as will be explained below. In both cases, the request can be generated because the system 202 needs a certain font to display or otherwise present an electronic document. For example, the request can identify the glyph(s) of a particular font that the system 208 and/or 210 needs. In response to the request, the system 202 can forward information obtained from the font database 204. In some implementations, such information can define a subset of the multiple glyphs identified in the request and not a remainder of the multiple glyphs other than the subset. For example, the information in the response can include only the specified glyph(s) of a particular font; in this particular embodiment however glyphs corresponding to a predicted follow-set are also contained in the response to reduce the likelihood that further request are needed. Fonts and/or glyphs can be defined using any suitable structure of information. For example, the font can identified by a font identifier in the electronic document and one or more glyphs can be specified using a codepoint in the electronic document.

In some implementations, the font packager 212 can create the requested package using a labelled font subset that includes a font identifier for the font in the font database 204 and an accompanying base file, a label including a font name by which the subset can be referred, and a set of codepoints (e.g., a Unicode set) to be packaged.

Referring to FIG. 4(b), the query predictor 213 includes the necessary infrastructure for generating a symbol set 223 which comprises (i) entered symbols received from the system 208 and/or 210 and (ii) a symbol follow-set generated using the entered symbols. More specifically, the query predictor 213 employs computer software running on a processor or microcontroller to predict using the plurality of entered symbols one or more complete search queries. From the predicted search queries, the symbol follow-set is determined which comprises symbol(s) not in the entered symbols set which is or are added to the entered symbols.

Returning to FIG. 4(a) the symbol set 223 is provided to the font packager 212. The font packager 212 in response is configured to package in a font file the corresponding subset of glyphs for the identified font. The resulting font file is transmitted to the system 208 and/or 210 which therefore is/are provided with the glyphs needed to generate and display a document containing not only the entered symbols but also the symbol follow-set. Provided the subsequently entered characters are present in the file provided to system 208 and/or 210 no further font glyphs need to be requested from the server 202.

The query predictor 213 is in this case part of the server 202. It can however be a separate or external system associated with the server 202 which provides the symbol set 223 to the font packager 212 over a network.

The query predictor 213 can generate the symbol follow-set using one or a number of known prediction algorithms. For example, the algorithm could operate on pre-defined models of word, character or phrase co-occurrence within a corpus of sample text. The corpus could be taken from general documents or be limited to different use cases. For example, in the present example of serving advertisement documents, the corpus could comprise advertisements or related text. The pre-defined models would allow for the calculation of the numerical probability of likely words, characters or phrases to follow the already-entered symbols.

An example model is that of lexical attraction, described in "Lexical Attraction Models of Language", by Deniz Yuret, http://people.csail.mit.edu/gremio/Grembrary/Winston-HIE/yuret.pdf.

A further example is that employed by Google Instant which offers auto-complete search terms when users enter characters, words or phrases in the Google search engine.

Given a language model capable of providing numerical probabilities of character, word or phrase occurrence, the query predictor 213 algorithm can employ thresholding in order to constrain the follow-set to a limited number and therefore also constrain the font file size. The algorithm returns a glyph set including the original glyphs, and any glyphs in the model that have a likelihood of appearing that is higher than a predetermined threshold, say 10%. The threshold could be experimentally calculated and modified to minimize the number of subsequent requests that occur due to an incorrect prediction (and therefore incomplete glyph set) whilst also minimizing the number of glyphs in a set that need to be packaged and sent to the client side. The relative priority between number of requests and number of glyphs in set can also be modified/tuned.

For example, consider a language model which calculates word co-occurrence for the word "basket"; the words "flower", "ball", "case" and "picnic" might be the complete queries predicted by the prediction algorithm. If they result in respective likelihood values of 13%, 30%, 5% and 6% then a 10% threshold employed by the algorithm would constrain the predicted complete queries to "flower basket" and "basket ball". The symbol set 223 will comprise the entered characters of "b", "a", "s", "k", "e", "t" and the follow-up set of "f", "l", "o", "w", "r", and "l", thereby resulting in the font packager 212 generating and sending to system 208 and/or 210 a font file containing glyphs that cover the predicted search terms as well as the term "basket".

The threshold can be modified dynamically based on the results obtained. For example, it can be dynamically lowered if the characters entered subsequently are not present in the glyph set of the packaged font file. This can be done incrementally, e.g. in 2% increments, each time a new request is required due to the fonts not being present in the previous response. This will generally result in larger file sizes due to the greater number of glyphs in the packaged font file but will increase the likelihood of the required glyphs being present. Conversely, the threshold can be dynamically increased to obtain a smaller number of separate predictions; this will generally result in smaller file sizes but will increase the likelihood that further font requests will be needed. As another option, the threshold can be adjusted to ensure that a minimum number of predictions are obtained.

The document creator can use a frontend application 214 in one or more aspects of managing the electronic document. In some implementations, the frontend application 214 can generate the interface 100 (FIG. 3) and/or can be used for creating a document such as an ad.

The font database 204 can provide font availability information 216 to the frontend application 216, for example such that one or more available fonts can be identified in the area(s) 106 (FIG. 3). The frontend application 214 can provide one or more uploaded fonts 218 to the font database 204, for example a custom font that the document creator provides to the database. A custom font can be defined in any suitable way, such as by creating definitions for vector graphics such that font glyphs can be generated in more than one font size and/or style (e.g., in boldface). For example, a font can be defined using any suitable font format, such as in form of a TrueType font, an OpenType font, or a Type 1 font, to name just a few examples.

The font database 204 can provide one or more base font files 220 to the font packager 212. For example, the font database 204 can provide the glyph(s) sought by another system such as the system 208 and/or 210 by way of the query predictor 213. The font packager 212 can generate a packaged font 222 in a font file using the obtained fonts, for example in form of a .swf file or any other suitable format.

As explained above, when employing the query predictor 213, the font packager 213 requires only the needed glyphs from the font database 204 and packages them after receipt.

The frontend application 214 can take one or more actions with regard to the packaged font 222. For example, the frontend application 214 can forward the packaged font 222 to the system 208 and/or 210 for use in displaying or otherwise presenting an electronic document. As another example, the frontend application can use the packaged font 222 in creating a version of the electronic document (e.g., by replacing codepoints and/or other glyph placeholders in the document with the actual glyph chosen by the creator). Such a created version of an electronic document can be stored in a static content server (SCS) 224. In some implementations, image(s) of a created document can be stored in the SCS 224 and thereafter provided to one or more viewers. For example, a created advertisement using a particular font can be stored in the SCS 224 and be served to any or all of the end user systems 210 upon a predefined event, such as that the user enters a particular query or visits a certain page or site.

It was mentioned above that the electronic document can be stored, such as in the SCS 224. As another example, a packaged font file can be stored in the SCS 224. In some implementations, this can allow multiple documents to refer to, and use, the packaged font file. For example, an advertisement document can exist in different size variations that all include the same text, or some variations can use only a subset of the supported text of another variation. A stored font package, such as a font .swf file, can allow multiple variations to use a common file.

Where the query predictor 213 generates a symbol set 223 which includes entered symbols and predicted symbols, the symbol set and/or the packaged font file that results therefrom can be stored in the SCS 224 or another, separate cache memory. For subsequent client queries, the query predictor 213 can search for a cached symbol set 223 or packaged font file that is the same or contains a superset of the symbols required in the query. Rather than creating a new symbol set or font file, therefore, the step of obtaining the required glyphs for a font may comprise searching for a file containing the identical set or a superset of glyphs covering the symbols that have been entered and the predicted characters in the required font. If an appropriate set or superset is found, it is returned in reply to the request. If not found, the process referred to previously is followed by means of the font packager 212 generating a packaged font file that contains the entered symbols and the predicted symbols, returning the set or superset in reply to the client request, and storing the generated file in the SCS 224 or a separate cache. This obviates the need to needlessly use processing resources at the server 202 to generate a new packaged font file.

The editing system 208 can be used for editing an electronic document 226. For example, the document 226 may have been created on the system 202 by an ad creator using the frontend application 214. Then, an ad editor can make selected changes in the document 226 using the same application 214 or another application. Accordingly, one user can create the electronic document 226 on one device and another user can modify the electronic document 226 on another device. The other device (e.g., the system 208 and/or 210) can determine what glyph(s) the electronic document 226 requires, for example by reading each codepoint defined in the document. The other device can then generate a request to the system 202 based on such a determination. For example, the request can identify the subset of glyphs that is needed, taking into account also the above-mentioned prediction algorithm in the query predictor 213. In some implementations, the font includes a non-Latin script (such as, but not limited to, those used in the Chinese, Japanese and Korean languages). For example, each of the multiple glyphs requested for the electronic document 226 can be a non-Latin glyph. Thus, the electronic document 226 can be presented using the system 208 and/or 210 such that the document includes the glyph(s) requested and received from the font database 204.

Further editing of the electronic document 226 can be performed. In some implementations, the system 208 and/or 210 can detect whether the editor enters one or more glyphs not already used in the document, and if necessary request and receive any such glyph(s) from the font database 204 including possible glyphs determined by the prediction algorithm in the query predictor 213. The document 226 can be updated when a requested glyph has been received. In some implementations, a determination that the revised document includes at least another glyph not already stored on the local device can be performed upon a predetermined event, such as an explicit refresh command from the user or a period of user inactivity. For example, assume that the editor is working on a revision of the electronic document 226. After the user makes a change in the document and a certain time passes without further input from the user, the system can automatically determine whether the revised document requires any additional glyph(s) not already present. If so, the required glyph(s) can be requested together with glyphs determined by the prediction algorithm in the query predictor 213. This and/or other functionality on the requesting device can be provided by execution of instructions in any form of script, such as by Javascript code.

In all such cases, the presence of the query predictor 213 should reduce the likelihood that glyph(s) are not present because previous requests will have caused transfer of glyphs based on predicted symbols and not only those specifically entered.

In some implementations, an exception can be generated upon a condition being met, such as if a requested font does not exist in the font database 204. In contrast, one or more issues may be explicitly ignored. In some implementations, no exception may be generated for an invalid font range. For example, if a request is made for a font subset that includes one or more characters not present in the base font, the character(s) will be omitted/ignored in responding to the request.

The glyph(s) can be requested using an address of the font database 204. For example, each font covered by the font availability information can be identified by a font identifier. The sought glyph(s) can then be requested by contacting the font packager 212 with the identities of the font and the specific glyph(s). In some implementations, the necessary information for where to obtain fonts that are not embedded in the electronic document and not otherwise available to the receiving system can be included in the document 226. For example, the document 226 can include information that identifies the computer system 202 and/or the font package 212 as the resource for requesting a font for a document. In some implementations, the necessary information for obtaining fonts can be included in the applicable program handling the document, such as in a browser and/or in the frontend application 214. For example, the frontend application 214 can be installed both on the device where the document is created (e.g., on the system 202) and on the device where the document is to be edited (e.g., on the system 208). The program 214 can then use its internal identification of the computer system 202 and/or the font package 212 to seek and obtain the necessary font(s).

The end user system 210 can be used for accessing or editing one or more electronic documents. In some implementations, the end user system can include any kind of computer device, such as a personal computer, mobile device or a telephone. For example, an ad using a predefined font (such as a custom font) can be displayed on a device operated by a consumer.

FIG. 5 shows an example system 300 that includes a font server 302. Components that in some implementations can correspond to those of the system 200 (FIG. 4(*a*)) are identified using corresponding reference numbers. In some implementations, the server 302 implements the same interface as the query predictor 213 and the font packager 212 and acts as a wrapper to block calls to a server. For example, an implementation that uses a standard client-server framework can allow a reduction or minimization of code dependencies in the frontend program 214.

A static font database 304 can be included in the system 300. In some implementations, the database 304 can allow only queries for available fonts. For example, the database 304 can be encapsulated in the server 302, such as to avoid application dependency (e.g., by the application 214) on the font data directly.

For example, a packaged font file can be provided by the server 302 for receipt by the frontend application 214, such as for direct receipt by an end user system or an editor, or for placement in the SCS server 224.

FIG. 6 shows a table 400 with example compile times and file sizes. Here, a font column 402 indicates which font is implicated by a particular character or characters. An ant aliasing column 404 indicates whether advanced ant aliasing is provided for the font identified in column 402. A character column 406 indicates which characters are defined using the identified font in each example. A compile time column 408 indicates the median compile time in milliseconds. A file size column 410 indicates a size in Bytes of a .swf file generated for the characters identified in the column 406. Here, the advantage in terms of smaller file size for files covering a subset of characters as opposed to the entire set is clear.

FIGS. 7 and 8 show flowcharts of example methods for obtaining a font file for a document at the client side and generation of the packaged font file at the server side, respectively.

Referring to FIG. 7 which shows a flowchart of an example method 700 for obtaining a font file at the client side, the method 700 can be performed by a processor executing instructions in a computer-readable medium, for example in system 200 and/or 300. In some implementations, more or fewer steps can be performed; as another example, one or more steps can be performed in another order.

In step 710, each glyph of a font that is specified in contents of an electronic document is determined, for example based on entered symbols in a search portal or an editing application. The determination identifies a subset of multiple glyphs included in the font. The subset is determined on a first device that does not have the font stored thereon. For example, the system 208 and/or 210 can determine the glyph(s) of the electronic document 226 for which the system does not have the corresponding font.

In step 720, a request is generated to a second device, in this case a font server, based on the determination. The request identifies the subset to the second device. For example, the system 208 and/or 210 can generate a request to the query predictor 213 of the font serving system 202 in FIG. 4(*a*).

In step 730, information is received at the first device. The information is sent from the second device in response to the request and defines the subset of the multiple glyphs which include those specified in the request of step 720 and those predicted at the second device based on the entered characters. The information does not define a remainder of the multiple glyphs other than the subset. For example, the system 208 and/or 210 can receive from the font packager 212 a .swf font file with only those glyphs of the font that the system 208/210 needs for presenting the document and a limited number of additional glyphs covering predictions. If the query or the document is subsequently revised, then there is a good likelihood that the appropriate glyphs are already present in the received information due to the predictive function of the second device that sent the font file. If not, another request can be generated for any additional glyph(s) not covered by the first request.

In step 740, presentation of the electronic document is generated using the received information. The presentation includes the subset of the multiple glyphs. For example, the system 208/210 can display, print or otherwise visualize the electronic document 226, such as in an editing program where a user can make document changes.

FIG. 8 shows a flowchart of an example method 800 for generation of the packaged font file at the second (server) device. In some implementations, the method 800 can be performed by a processor executing instructions in a computer-readable medium, for example in system 202. In some implementations, more or fewer steps can be performed; as another example, one or more steps can be performed in another order.

In step 810, a request is received from the first device specifying a particular font and a set of symbols. In step 820, a prediction algorithm is employed to predict a symbol follow-set based on the symbols received in step 810. In step 830, the symbol set containing unique characters of the received request and the symbol follow set is generated. The symbol set identifies a subset of all available glyphs for the font and therefore does not identify all of them. In step 840, it is determined whether there is already a cached font file containing the symbol set, e.g. a superset. If not, then in step 850 a packaged font file is generated containing glyphs covering only the symbol set and in step 860 the font file is cached for future use. The font file is then transmitted to the first device in step 710. If a cached version is present, then it is retrieved and transmitted to the first device in step 870.

Figure 9:
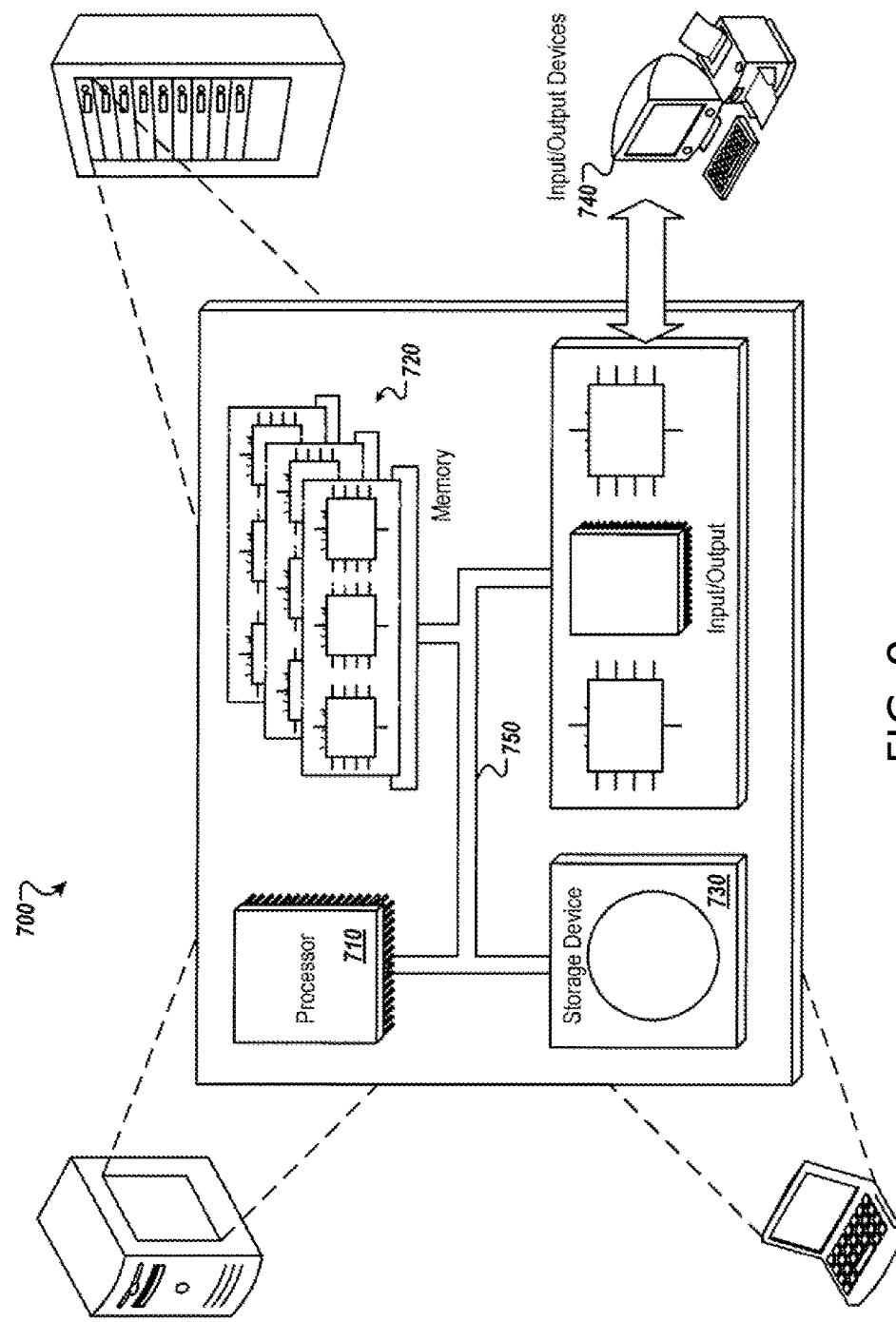
FIG. 9 is a block diagram of a computing system that can be used in connection with computer-implemented methods described in this document.

FIG. 9 is a schematic diagram of a generic computer system 700. The system 700 can be used for the operations described in association with any of the computer implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor.

The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory can be supplemented by, or incorporated in, ASICs (application-specific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

The invention claimed is:

1. A method comprising:
receiving at a server a query entered at a client device, the query comprising a plurality of characters;
predicting characters that have a likelihood of following the plurality of characters above a threshold, by a query predictor executed by a processor of the server, by:
identifying, for the plurality of characters a minimum number of auto-complete items needed to minimize a number of subsequent live query requests,
identifying, for the plurality of characters, a maximum number of auto-complete items needed to constrain glyph set size for the plurality of characters,
determining a relevance probability threshold for a plurality of auto-complete items needed to yield at least the minimum number of auto-complete items, the relevance probability threshold inversely proportional to a number of items in the plurality of auto-complete items, and as each of the plurality of auto-complete items is generated, dynamically lowering the relevance probability threshold to reach a number of auto-complete items that is equal to the maximum number;
obtaining a glyph set, including at least one of the plurality of auto-complete items, the at least one of the plurality of auto-complete items inclusive of the plurality of characters and of the predicted characters in a font; and
transmitting the glyph set to the a client device.

2. A method as claimed in claim 1, wherein obtaining the glyph set comprises creating the glyph set.

3. A method as claimed in claim 1, wherein obtaining the glyph set comprises:
searching for a superset of glyphs that contain the plurality of characters that have been entered and the predicted characters in a font; and
generating a superset of glyphs that contain the plurality of characters that have been entered and the predicted characters in a font, returning the superset in reply to the request, and storing the generated superset in a cache responsive to not finding a superset.

4. A method as claimed in claim 1, wherein predicting characters comprises using a prediction algorithm that takes as input the plurality of characters that have been entered and applies them to a language model indicative of character, word, or phrase co-occurrence in sample text, the prediction algorithm returning one or more predicted characters based on predicted character, word, or phrase co-occurrence.

5. A method as claimed in claim 4, wherein the language model indicates co-occurrence between characters, words, or phrases in a body of text associated with a particular type of information.

6. A method as claimed in claim 1, wherein predicting characters comprises using a prediction algorithm that takes as input the plurality of characters that have been entered and applies them to a language model indicative of lexical attraction between pairs of words, the prediction algorithm returning one or more predicted characters based on lexical attraction between words formed by the entered characters and words in the model.

7. A method as claimed in claim 1, further comprising receiving identification of a font with the query and obtaining the glyph set for that font.

8. An apparatus, comprising:
a network interface configured to receive at a server a query entered at a client device, the query comprising a plurality of characters; and
a processor executing a query predictor;
wherein the query predictor is configured to predict characters that have a likelihood of following the plurality of characters above a threshold, by:
identifying, for the plurality of characters, a minimum number of auto-complete items needed to minimize a number of subsequent live query requests,
identifying, for the plurality of characters a maximum number of auto-complete items needed to constrain glyph set size for the plurality of characters,
determining a relevance probability threshold for a plurality of auto-complete items needed to yield at least the minimum number of auto-complete items, the relevance probability threshold set to decrease as a number of items in the plurality of auto-complete items increases, and
as each of the plurality of auto-complete items is generated, dynamically lowering the relevance probability threshold to reach a number of auto-complete items that is equal to the maximum number,
wherein the query predictor is further configured to obtain a glyph set including at least one of the plurality of auto-complete items, the at least one of the plurality of auto-complete items inclusive of the plurality of characters and of the predicted characters in a font; and
wherein the network interface is further configured to transmit the glyph set to the client device for use in creating the electronic document.

9. The apparatus as claimed in claim 8, wherein the query predictor is further configured to create the glyph set.

10. The apparatus as claimed in claim 8, wherein the query predictor is further configured to:
search for a superset of glyphs that contain the plurality of characters that have been entered and the predicted characters in a font,
generate a superset of glyphs that contain the plurality of characters that have been entered and the predicted characters in a font responsive to not finding a superset, and
return the superset in reply to the request; and
further comprising a cache configured to store the generated superset.

11. The apparatus as claimed in claim 8, wherein the query predictor is further configured to adjust the probability threshold dynamically to ensure a predetermined number of sets of predicted characters are identified.

12. The apparatus as claimed in claim 8, wherein the query predictor is further configured to receive the plurality of characters that have been entered, and generate one or more predicted characters based on predicted character, word, or phrase co-occurrence via a language model based on sample text.

13. The apparatus as claimed in claim 8, wherein the query predictor is further configured to receive the plurality of characters that have been entered, and generate one or more predicted characters based on lexical attraction between words formed by the entered characters and words indicated in a language model.

14. The apparatus as claimed claim 13, wherein the language model indicates lexical attraction between characters, words, or phrases in a body of text associated with a particular type of information.

15. The apparatus as claimed in claim 8, wherein the query predictor is further configured to receive identification of a font with the query and obtaining the glyph set for that font.

16. A non-transitory computer-readable storage medium having stored thereon computer-readable code, which, when executed by computing apparatus, causes the computing apparatus to perform a method comprising:
a client device sending to a server a query entered at the client device, the query comprising a plurality of characters;
the client device receiving from the server obtaining a glyph set including the plurality of characters that have been entered and the predicted characters in a font, the glyph set being absent of other glyphs of the font, wherein the predicted characters are generated, by a query predictor, by generating a plurality of auto-complete items for the plurality of characters such that, as each of the plurality of autocomplete items is generated, a relevance probability threshold is dynamically lowered to a value in a range between a maximum number of auto-complete items needed to constrain glyph set size for the plurality of characters and a minimum number of auto-complete items needed to minimize a number of subsequent live query requests; and
the client using the glyph set in creating the electronic document.

* * * * *